No. 729,970. PATENTED JUNE 2, 1903.
F. SPALDING.
MICROMETER CALIPERS.
APPLICATION FILED JULY 24, 1902.
NO MODEL.
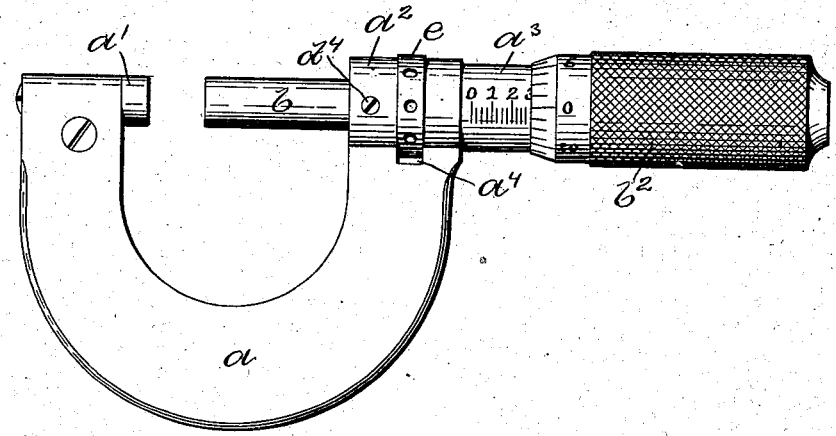
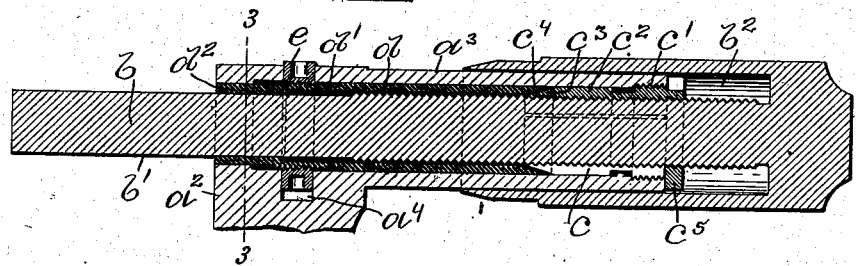
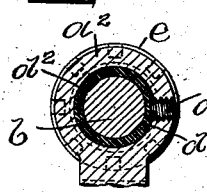  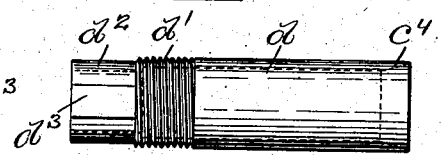
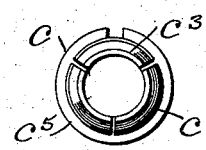 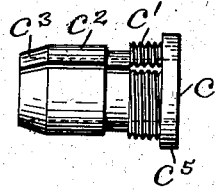 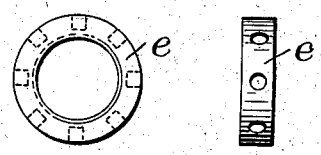
WITNESSES:
Ada E. Fagerty
B. S. Webster
INVENTOR:
Frank Spalding
Joseph H. Miller & Co.
ATTORNEYS.

No. 729,970. Patented June 2, 1903.

UNITED STATES PATENT OFFICE.

FRANK SPALDING, OF PROVIDENCE, RHODE ISLAND, ASSIGNOR TO BROWN & SHARPE MANUFACTURING COMPANY, OF PROVIDENCE, RHODE ISLAND.

MICROMETER-CALIPERS.

SPECIFICATION forming part of Letters Patent No. 729,970, dated June 2, 1903.

Application filed July 24, 1902. Serial No. 116,789. (No model.)

*To all whom it may concern:*

Be it known that I, FRANK SPALDING, a citizen of the United States, residing at Providence, in the county of Providence and State of Rhode Island, have invented a new and useful Improvement in Micrometer-Calipers, of which the following is a specification.

In micrometer-calipers the accuracy of the micrometric measurement depends on the fit of the leading-screw on the spindle with the internally-screw-threaded nut with which it engages. With a slight looseness of fit or backlash the measurement will be inaccurate and unreliable. In practice the spindle requires to be turned a number of turns to adjust the same to the object to be measured. During this movement the spindle should turn freely in the screw-threaded nut. When the spindle is adjusted and the measurement is to be taken, the screw-thread engagement of the spindle with the nut should be a close fit, free from possible backlash. When the measurement is taken, the spindle should be firmly locked. Heretofore devices have been used to clamp the unthreaded portion of the spindle. Such devices were usually operated by a rotatable part acting on a split sleeve or tongue and were not reliable for the microscopic measurements now required. In practice I find that owing to the inclined V-shaped surfaces of the screw-threads the spindle may be securely locked by bringing the split part of the internally-screw-threaded nut in close contact with the screw-threaded portion of the spindle, and I have designed a micrometer-caliper in which the screw-thread engagement of the spindle may be adjusted while in use, so that the spindle may turn freely for adjustment, may turn without backlash while the measurement is taken, and may then be locked by a tube moving longitudinally with the spindle.

My invention consists in the peculiar and novel construction and the combination of the parts, more fully set forth hereinafter, by which the above-described results may be obtained.

Figure 1 is a side view of my improved micrometer-caliper. Fig. 2 is a longitudinal sectional view taken through the center of the spindle. Fig. 3 is a transverse sectional view on the line 3 3 of Fig. 2. Fig. 4 is an end view of the operating-tube, and Fig. 5 is a side view of the same. Fig. 6 is an end view of the split internally-screw-threaded nut-sleeve, and Fig. 7 is a side view of the same. Fig. 8 is a side view, and Fig. 9 an edge view, of the actuating-ring.

Similar marks of reference indicate corresponding parts in all the figures.

In the drawings, $a$ indicates the frame of the caliper; $a'$, the anvil end of the frame; $a^2$, the spindle end of the frame, and $a^3$ the externally-graduated tubular sleeve extending from the end $a^2$ and forming with this end the support of the spindle $b$. The end $a^2$ has the slot $a^4$ extending transversely through the same. The tubular sleeve $a^3$ is internally screw-threaded at its outer end to receive the external screw-thread $c'$ of the internally-screw-threaded and longitudinally-split nut $c$, the cylindrical portion $c^2$ of which normally fits the bore of the sleeve. The tapering end $c^3$ of the sleeve $c$ coöperates with the internally-tapering end $c^4$ of the actuating-tube $d$. The nut $c$ is longitudinally split up to the flange $c^5$ into two or more parts, so that these parts may be forced inward toward a common center and the internal screw-nut contracted. The actuating-tube $d$ fits the bore of the sleeve $a^3$ with a sliding fit. The portion $d'$ of the tube is externally screw-threaded. The end $d^2$ is preferably of less diameter and fits the bore of the end $a^2$ and the cylindrical portion of the spindle $b$ with a close sliding fit. The end $d^2$ of the tube is provided with the seat $d^3$, on which the screw $d^4$ bears to hold the tube $d$ against rotation.

The internally-screw-threaded ring $e$ is in engagement with the screw-threaded portion $d'$ of the actuating-tube $d$ and is supported in the slot $a^4$. The spindle $b$ has the cylindrical end $b'$ supported in the end $d^2$ of the tube $d$ and the screw-threaded portion supported in the nut $c$. The graduated and usually milled sleeve $b^2$ forms part of and rotates with the spindle $b$.

In a micrometer-caliper of my construction the screw-threaded spindle may turn in the nut freely while it is adjusted for taking the measurement. The ring $e$ may now be rotated to slide the tube $d$ in the bore of the sleeve $a^3$ until the tapering end of the tube is forced over the tapering end $c^3$ of the nut to bring the internally-screw-threaded split portions of the nut into close contact with the screw-thread on the spindle, and when the measurement has been taken the spindle may be locked by forcing the tapering end $c^4$ between the wall of the bore in the sleeve and the split parts of the nut. By the reverse rotation of the ring $e$ the spindle may be again released. All the adjustments may be made while the caliper is in use.

Having thus described my invention, I claim as new and desire to secure by Letters Patent—

1. In a micrometer-caliper, the combination with the sleeve extending from one end of the frame and the screw-threaded spindle, of a longitudinally-split nut provided with a tapering end, a tube in the bore of the sleeve, and means for sliding the tube on the bore and over the tapering end of the nut, as described.

2. A micrometer-caliper having the screw-spindle connected with a longitudinally-split nut, in combination with a tube, and means for sliding the end of the tube over the end of the split nut, as and for the purpose described.

3. In a micrometer-caliper, the combination with the sleeve, the longitudinally-split nut having the tapering end, and the screw-threaded spindle, of the actuating-tube $d$ provided with the tapering end $c^4$ and the screw-threaded portion $d'$, means for holding the actuating-tube against rotation, and the internally-screw-threaded ring $e$, as described.

4. In a micrometer-caliper, the combination with the end $a^2$ of the frame provided with the tubular sleeve $a^3$, of the split nut $c$ provided with the tapering end $c^3$ and the cylindrical part $c^2$, the actuating-tube $d$ having the tapering end $c^4$, means for holding the actuating-tube against rotation, and means for sliding the tapering end of the actuating-tube over the tapering end of the nut, as described.

5. In a micrometer-caliper, the combination with the frame $a$ provided with an anvil end $a'$, a spindle end $a^2$, a graduated tubular sleeve $a^3$, and a slot $a^4$, and the screw-threaded spindle $b$ having the graduated sleeve $b^2$, of the split nut $c$ provided with the cylindrical part $c^2$ and the tapering end $c^3$, the actuating-tube $d$ having the tapering end $c^4$ and the screw-thread $d'$, and the internally-screw-threaded ring $e$ located in the slot $a^4$, as described.

6. In a micrometer-caliper, a tubular sleeve forming part of the frame, a split nut secured in the end of said sleeve, a screw-threaded spindle engaging with the split nut, and an actuating-tube adapted to be moved longitudinally over part of the split nut, as and for the purpose described.

In testimony whereof I have signed my name to this specification in the presence of two subscribing witnesses.

FRANK SPALDING.

Witnesses:
 ADA E. HAGERTY,
 J. A. MILLER Jr.